J. F. KALETAY.
DISPENSING FAUCET.
APPLICATION FILED APR. 20, 1916.

1,233,482.

Patented July 17, 1917.

INVENTOR.
Joseph F. Kaletay.
BY
HIS ATTORNEYS.

UNITED STATES PATENT OFFICE.

JOSEPH F. KALETAY, OF NEW YORK, N. Y.

DISPENSING-FAUCET.

1,233,482.    Specification of Letters Patent.    Patented July 17, 1917.

Application filed April 20, 1916. Serial No. 92,378.

*To all whom it may concern:*

Be it known that I, JOSEPH F. KALETAY, a subject of the King of Hungary, residing at New York, in the county of New York and State of New York, have invented new and useful Improvements in Dispensing-Faucets, of which the following is a specification.

This invention relates to improvements in apparatus for dispensing fluids, and a chief object thereof is the provision of a dispensing receptacle adapted to maintain milk and other fluids free from contaminating influences and to deliver the same in predeterminable quantities at such intervals as may be desired.

A further object is to combine with a dispensing receptacle of this character a novel form of faucet, which is designed to deliver liquids without loss or waste and in which the end of the spout is protected against the entrance of insects or contaminating influences.

These and other objects are attained by the novel construction and combination of parts hereafter described and shown in the accompanying drawings, forming a material part of this specification, and in which:—

Figure 1:
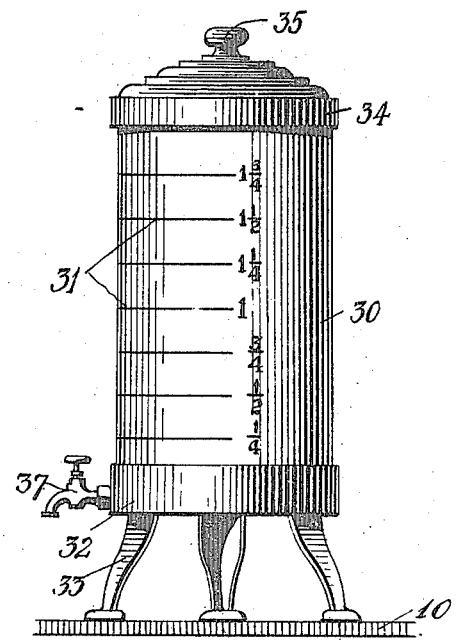
Figure 1 is a perspective view of a dispensing receptacle equipped with my faucet.
Figure 2:
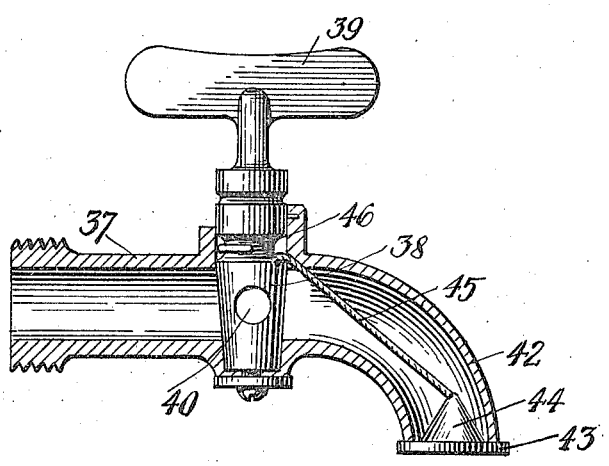
Fig. 2 is a longitudinal sectional view of the dispensing faucet.

Referring more particularly to the accompanying drawings, the numeral 30 indicates a dispensing receptacle preferably made of glass in the form of a cylinder and provided with a plurality of index lines 31, registering visually the quantity of contents therein.

The receptacle stands upon a base 32, supported by legs 33 from the shelf or support 10. It is further provided with a domed cover 34 having an operating knob 35 at its apex, by which the cover can be bodily removed allowing free access to the interior for the purpose of cleansing or otherwise.

Threaded into the base 32 so as to communicate with the interior of the receptacle is a faucet 37, the same being provided with a tapered plug 38, having an operating handle 39, and a transverse opening 40.

At the end 42 of the faucet spout 37 is a disk 43, having a conical stem 44, adapted to enter the spout and having attached at its apex, a flexible cord 45, the same being attached at its opposite end to the plug 38 in such manner that as the plug is rotated, the cord is caused to wind in a groove 46 so as to draw the disk, which may be made of a relatively soft elastic material as rubber, tightly against the bottom of the faucet spout when the plug is in position to close the opening through the faucet.

Thus it is possible to prevent insects, dust and deleterious matters in the atmosphere from entering the faucet, whereby the milk or other fluid might be rendered unfit for use.

Having thus described my invention, what I claim as new and desire to secure by Letters Patent is:—

1. In combination with a liquid dispensing receptacle, a dispensing faucet having a key operated plug, a disk designed to make liquid-tight contact with the spout of said faucet, a guiding element combined with said disk and enterable within the faucet spout, and a connection between said guiding element and said plug whereby when the latter is turned, the disk is brought into liquid-tight contact with the spout of the faucet.

2. The combination with a liquid dispensing receptacle having index characters visualizing quantities of the contents and having a faucet with a key operated plug, of a disk designed to make liquid-tight contact with the spout of said faucet, a guiding element combined with said disk and enterable within the faucet spout, and a connection between said guiding element and said plug whereby, when the latter is turned, the disk is brought into liquid-tight contact with the spout of the faucet.

3. In a faucet, the combination with a tapered plug, having a key operated stem, and a passage formed therethrough, of a flexible disk adapted to make contact with the mouth of said faucet, said disk having a guiding means enterable within the faucet spout, and connections between said guiding means and said plug, whereby when the latter is turned, the disk is brought into close contact with the mouth of the faucet.

In testimony whereof I have signed my name to this specification.

JOSEPH F. KALETAY.

Copies of this patent may be obtained for five cents each, by addressing the "Commissioner of Patents, Washington, D. C."